(12) United States Patent
Yanase et al.

(10) Patent No.: US 8,733,947 B2
(45) Date of Patent: May 27, 2014

(54) LIGHT SOURCE CONTROL DEVICE AND PROJECTOR

(75) Inventors: Shigehiro Yanase, Matsumoto (JP); Kenichi Shioiri, Matsumoto (JP); Masahide Tsuda, Shiojiri (JP); Osamu Saito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 327 days.

(21) Appl. No.: 13/189,053

(22) Filed: Jul. 22, 2011

(65) Prior Publication Data
US 2012/0050696 A1    Mar. 1, 2012

(30) Foreign Application Priority Data

Aug. 26, 2010    (JP) .................................. 2010-189682

(51) Int. Cl.
| | |
|---|---|
| G03B 21/20 | (2006.01) |
| G05F 1/00 | (2006.01) |
| H05B 37/02 | (2006.01) |
| H05B 39/04 | (2006.01) |
| H05B 41/36 | (2006.01) |

(52) U.S. Cl.
USPC ............................. 353/85; 315/307; 315/297

(58) Field of Classification Search
USPC .............. 353/85, 94, 122, 121; 315/307, 291, 315/294, 297, 36, 192, 224, 287, 308, 312
See application file for complete search history.

(56) References Cited

U.S. PATENT DOCUMENTS

| | | | |
|---|---|---|---|
| 2005/0280783 A1 | 12/2005 | Yamasaki et al. | |
| 2008/0143970 A1* | 6/2008 | Harbers et al. | 353/31 |
| 2008/0290906 A1* | 11/2008 | Chou et al. | 327/77 |

FOREIGN PATENT DOCUMENTS

| | | |
|---|---|---|
| CN | 1710464 A | 12/2005 |
| JP | A-2002-329924 | 11/2002 |
| JP | A-2005-032798 | 2/2005 |

* cited by examiner

*Primary Examiner* — William C Dowling
*Assistant Examiner* — Ryan Howard
(74) *Attorney, Agent, or Firm* — Oliff PLC (57) ABSTRACT

A light source control device is for controlling a solid-state light source array having a plurality of solid-state light sources connected in series to each other, and includes a detector (a current detection resistor, voltage detection resistors, and operational amplifiers) adapted to detect at least one of a voltage applied to the solid-state light source array and a current supplied to the solid-state light source array, and a control circuit adapted to determine whether or not discontinuity of at least one of the voltage and the current is present using a detection result of the detector, and change control of one of the current and electrical power performed on the solid-state light source array if it is determined that the discontinuity is present.

15 Claims, 5 Drawing Sheets

LIGHT SOURCE CONTROL DEVICE AND PROJECTOR

BACKGROUND

1. Technical Field

The present invention relates to a light source control device and a projector.

2. Related Art

Solid-state light source such as laser diodes (LD) or light emitting diodes (LED) have advantages such as low power consumption, long life, small amount of heat generation, possibility of downsizing, and easiness of lighting/extinction control compared to halogen lamps or high-pressure mercury lamps. Therefore, in recent years, the solid-state light sources have been fast becoming to be used in a variety of fields. For example, in the projectors for displaying images on the screen, the solid-state light sources have started to be actively used for the purpose mainly of reducing the power consumption and the amount of heat generation to thereby achieve downsizing and weight reduction.

If the solid-state light sources such as LD or LED are deteriorated, the light intensity obtained tends to be degraded even if the current supplied thereto does not vary. In general, it is important for the light sources to provide constant light intensity irrespectively of the variation in the environmental temperature and the level of the deterioration. Therefore, in the past, it has been arranged that in the case in which the drop of the light intensity due to the deterioration of the solid-state light source has occurred, the supply amount of the current to the solid-state light source has been increased to thereby obtain a constant light intensity. It should be noted that there is a possibility that the deterioration of the solid-state light source is promoted due to the heat generation if the supply amount of the current to the solid-state light source is increased excessively.

JP-A-2005-32798 discloses a technology of detecting the drive current supplied to the LD, and then generating an error detection signal when the current value exceeds a predetermined value to perform, for example, output stoppage on the drive current to the LD, thereby preventing the deterioration and failure of the drive device for driving the LD from occurring. Further, JP-A-2002-329924 discloses a technology of detecting and storing the current value output from the LD drive device, obtaining the variation in the current value between the detected current value at present and the current value stored in advance to determine whether or not the deterioration of the LD is reaching the terminal stage, thereby making it possible to replace the LD before the fatal deterioration of the LD occurs.

Incidentally, as typical control methods of the solid-state light source, there can be cited the constant current control and the constant power control. The constant current control is a control method of performing the control so as to supply the solid-state light source with a constant current. In contrast, the constant power control is a control method of performing the control so as to supply the solid-state light source with a constant power. Since the light with the light intensity corresponding to the current supplied thereto is emitted from the solid-state light source, the constant current control, with which the light intensity is easily controlled, is often used. The constant power control is used in the case in which the power consumption is made constant, for example.

Here, in the case in which a light intensity higher than the intensity of the light emitted from one solid-state light source is required, there is used a light source device provided with a plurality of solid-state light sources arranged in a line or a sheet and connected in series or in parallel. For example, the projector described above is required to provide a light intensity so high as to make it possible to view the image displayed on a screen illuminated with an illumination device such as a fluorescent lamp to some extent, and is therefore almost required to have the light source device provided with a plurality of solid-state light sources arranged.

In such a light source device provided with a plurality of solid-state light sources, there can occur a situation in which some of the plurality of solid-state light sources shorts (short-circuits) due to deterioration to thereby cause the forward voltage drop (Vf) to be lowered rapidly. If the rapid variation in the forward voltage drop occurs during the operation of the constant power control, there arises a problem that an excessive current is supplied in order for making the power constant to cause the deterioration and failure of the other normal solid-state light sources to thereby shorten the life of the light source device. Further, if the rapid variation in the forward voltage drop occurs during the operation of the constant current control, there arises a problem that the light intensity is lowered as much as the light intensity corresponding to the solid-state light sources shorted to thereby cause light intensity variation although the excessive current supply can be avoided.

SUMMARY

An advantage of some aspects of the invention is to provide a light source control device capable of solving the problems, which can occur if some of the plurality of solid-state light sources is at fault, and a projector provided with the light source device.

An aspect of the invention is directed to a light source control device adapted to control a light source device having a plurality of solid-state light sources connected in series to each other, the light source control device including a detector adapted to detect at least one of a voltage applied to the solid-state light sources and a current supplied to the solid-state light sources, and a control section adapted to determine whether or not discontinuity of at least one of the voltage and the current is present using a detection result of the detector, and change control of one of the current and electrical power performed on the light source device if it is determined that the discontinuity is present.

According to this aspect of the invention, since it is arranged that the control of the current or the electrical power performed on the light source device is changed if it is determined that the discontinuity of the voltage applied to the solid-state light sources and the current supplied to the solid-state light sources is present using the detection result of the detector, the case, for example, in which the excessive current flows through the light source device due to the rapid variation in the current and the voltage, or the light intensity of the light source device changes rapidly can be prevented.

The light source control device of the above aspect of the invention may be configured such that the control section includes a storage section adapted to store the detection result of the detector, and compares the detection result of the detector and the detection result stored in the storage section with each other to thereby determine whether or not the discontinuity is present.

According to this configuration, since the detection result of the detector is stored in the storage section, and it is arranged that the detection result newly obtained and the detection result stored in the storage section are compared with each other to thereby determine whether or not the discontinuity of the voltage or the like is present, whether or not the discontinuity of the voltage and so on is present can accurately be determined with a simple configuration.

The light source control device of the above aspect of the invention may be configured such that the control section performs constant-power control corresponding to the detection result of the detector on the light source device if it is determined that the discontinuity is absent.

According to this configuration, since it is arranged that the constant-power control is performed on the light source device if it is determined that the discontinuity of the voltage and so on is absent, reduction of the power consumption can be achieved in the case in which the temporal degradation is caused in the solid-state light source provided to the light source device compared to the case of performing the constant-power control.

The light source control device of the above aspect of the invention may be configured such that the control section changes the constant-power control presently performed on the light source device to constant-current control if it is determined that the discontinuity is present.

According to this configuration, since the constant-power control on the light source device is changed to the constant-current control if it is determined that the discontinuity of the voltage and so on is present during the constant-power control performed on the light source device, the excessive current can be prevented from flowing through the light source device, and thus the life span of the light source device can be extended.

The light source control device of the above aspect of the invention may be configured such that the control section performs constant-power control so that the light source device is supplied with constant power if it is determined that the discontinuity is present.

According to this configuration, since the constant-power control is performed so that the light source device is supplied with the constant electrical power if it is determined that the discontinuity of the voltage and so on is present, a significant variation in the light intensity due to the discontinuity of the voltage and so on can be prevented.

The light source control device of the above aspect of the invention may be configured such that the control section figures out a deterioration state of the solid-state light sources based on the voltage and the current detected by the detector while gradually increasing an amount of current supplied to the solid-state light sources.

According to this configuration, the deterioration state of the solid-state light sources can be figured out only by detecting the current/voltage characteristics of the solid-state light sources using the detector while gradually increasing the amount of the current supplied to the solid-state light sources.

Another aspect of the invention is directed to a projector including a light source device including a plurality of solid-state light sources connected in series to each other, a light modulation device adapted to modulate a light from the light source device, a projection optical system adapted to project the light modulated by the light modulation device on a screen, and the light source control device described above, adapted to control the light source device.

According to this aspect of the invention, since the light source control device described above for controlling the light source device including the plurality of solid-state light sources connected in series to each other is provided, the projector can be used for both of the purpose of giving priority to the power consumption and the life span and the purpose of giving priority to the constant light intensity.

The projector of the above aspect of the invention may be configured such that the plurality of solid-state light sources provided to the light source device is arranged in one of a line and a sheet.

According to this configuration, since the plurality of solid-state light sources can also be arranged linearly in addition to the case in which the plurality of solid-state light sources is arranged in a sheet, the aspect of the invention can be applied to projectors provided with a variety of light source devices having a plurality of solid-state light sources.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a light source control device and a projector according to an embodiment of the invention will be described in detail with reference to the accompanying drawings. It should be noted that the embodiment described hereinafter shows only some aspects of the invention, but does not limit the scope of the invention, and can arbitrarily be modified within the technical concept of the invention.

Figure 1:
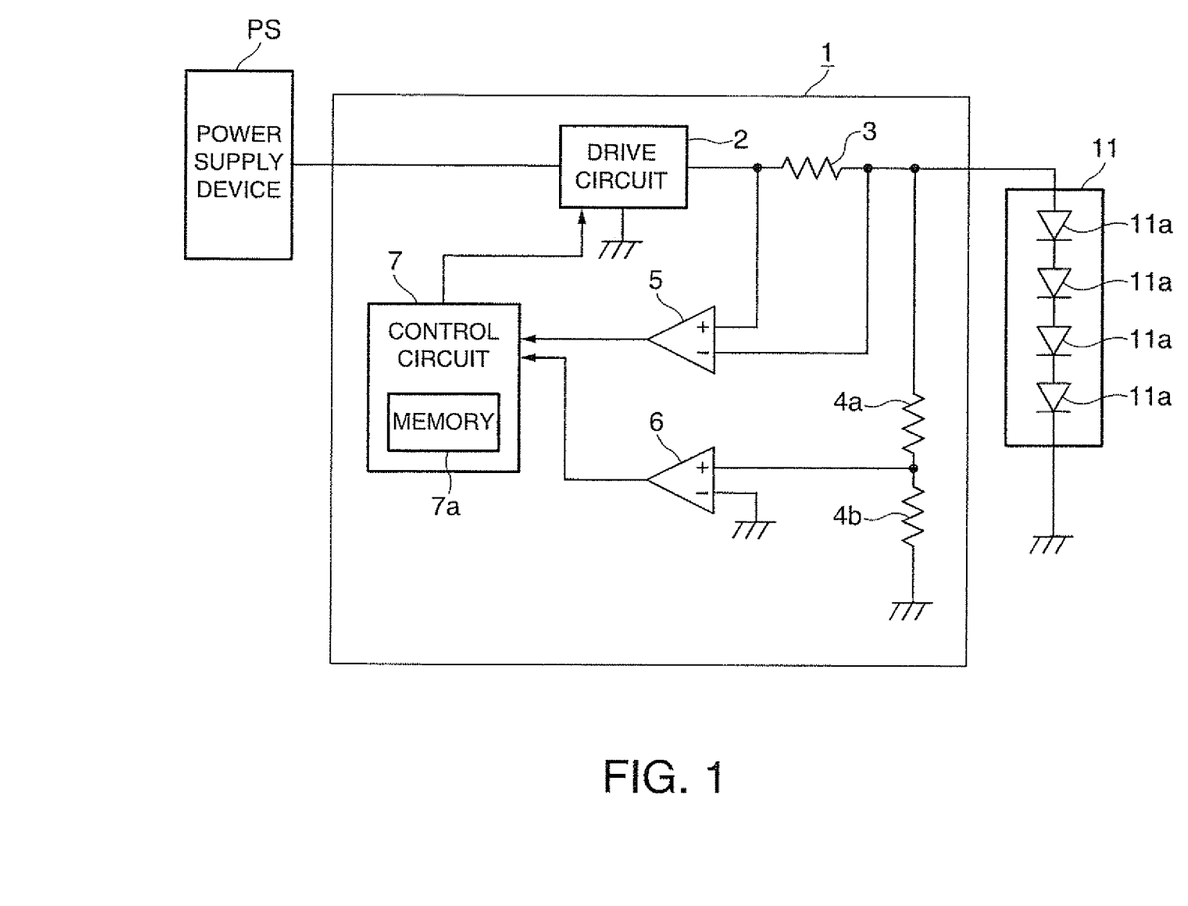
FIG. 1 is a block diagram showing a substantial configuration of a light source control device according to an embodiment of the invention.

FIG. 1 is a block diagram showing a substantial configuration of a light source control device according to the embodiment of the invention. As shown in FIG. 1, the light source control device 1 according to the embodiment is provided with a drive circuit 2, a current detection resistor 3 (a detector), voltage detection resistors 4a, 4b (detectors), operational amplifiers 5, 6 (detectors), and a control circuit 7 (a control section), and performs the drive control of a solid-state light source array 11 (a light source device) using electrical power supplied from a power supply device PS.

The power supply device PS generates the electrical power (e.g., a direct-current power with the voltage of 30V) for driving the solid-state light source array 11 using the electrical power supplied from the commercial power supply with a voltage of 100V, for example, and supplies the light source control device 1 with the electrical power thus generated. The solid-state light source array 11 has a plurality of solid-state light sources 11a connected in series to each other, and emits, for example, blue light due to the drive control performed thereon by the light source control device 1.

Figure 2:
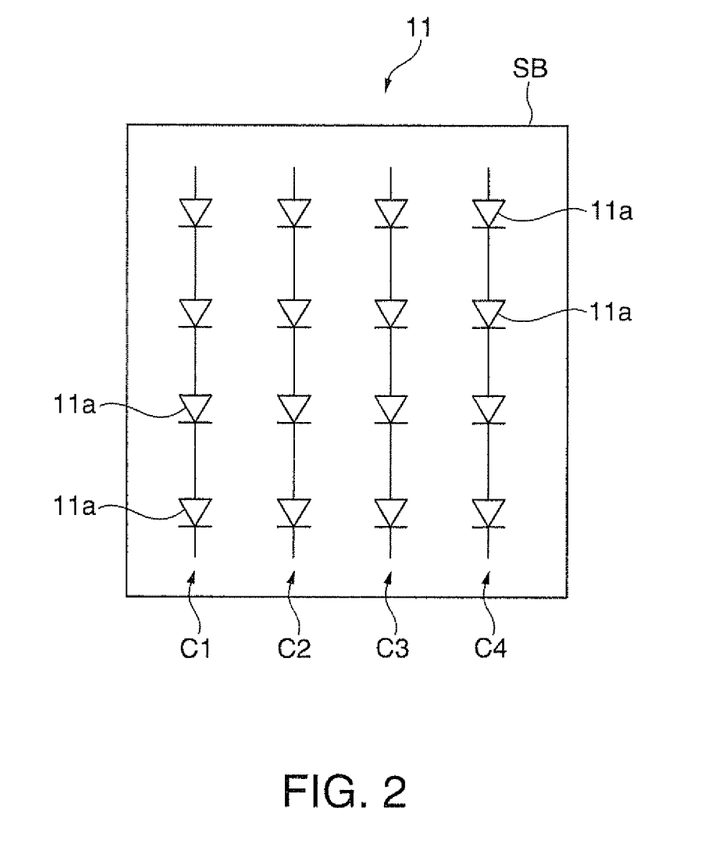
FIG. 2 is a diagram schematically showing a solid-state light source array on which the drive control is performed by the light source control device according to the embodiment of the invention.

FIG. 2 is a diagram schematically showing the solid-state light source array on which the drive control is performed by the light source control device according to the embodiment of the invention. As shown in FIG. 2, the solid-state light source array 11 is provided with a plurality of solid-state light sources 11a arranged in a sheet (matrix) on a substrate SB having a roughly rectangular shape. It should be noted that in order for avoiding complication, FIG. 2 shows, as an example, the solid-state light source array 11 provided with totally 16 solid-state light sources 11a arranged in a matrix composed of four rows of solid-state light sources 11a arranged in a vertical direction of the drawing sheet and four columns of solid-state light sources 11a arranged in a lateral direction of the drawing sheet. The number of solid-state light source 11a can arbitrarily be increased or decreased in accordance with the light intensity required.

The solid-state light sources 11a are each a semiconductor laser for emitting, for example, blue light (the peak emission intensity is at around 460 nm), and the solid-state light sources 11a arranged in the same column are connected in series to each other. In other words, the four solid-state light sources 11a arranged in the column indicated by the reference symbol C1 are connected in series to each other, and the four solid-state light sources 11a arranged in the column indicated by the reference symbol. C2 are connected in series to each other. The same can be applied to the solid-state light sources 11a arranged in the columns indicated by the symbols C3, C4.

It should be noted that although not shown in FIG. 2, among the solid-state light sources 11a arranged in the respective columns C1 through C4, the four solid-state light sources 11a arranged in the upper end part of the substrate SB are connected to each other in the anodes thereof, and the four solid-state light sources 11a arranged in the lower end part of the substrate SB are connected to each other in the cathodes thereof. In other words, the solid-state light sources 11a formed to have an arrangement of the solid-state light source array 11 are connected in series in the respective columns and are connected in parallel between the columns. The four solid-state light sources 11a connected to each other in the anodes thereof are connected to the light source control device 1, and the four solid-state light sources 11a connected to each other in the cathodes are grounded.

The four solid-state light sources 11a shown in FIG. 1 represent the four solid-state light sources 11a arranged in, for example, the column C1 shown in FIG. 2. It should be noted that although the solid-state light sources 11a provided to the solid-state light source array 11 are connected in series and in parallel as described above, the explanation will hereinafter be forwarded assuming that the four solid-state light sources 11a connected in series to each other shown in FIG. 1 are only provided to the solid-state light source array 11 in order for simplifying the explanation.

Returning to FIG. 1, the drive circuit 2 provided to the light source control device 1 drives the solid-state light source array 11 under the control of the control circuit 7 using the direct-current power supplied from the power supply device PS. Specifically, the drive circuit 2 is provided with a converter for stepping up or down the direct-current power supplied from the power supply device PS, and an inverter for providing a pulsed output in accordance with the circumstances, and controls the operations of the converter and the inverter to thereby make the voltage to be applied to the solid-state light source array 11, the current to be supplied to the solid-state light source array 11, or the electrical power to be supplied to the solid-state light source array 11 variable.

The current detection resistor 3 is a resistor used for detecting the current flowing through the solid-state light source array 11, and is disposed between the drive circuit 2 and the solid-state light source array 11. It should be noted that in the case in which the solid-state light sources 11a provided to the solid-state light source array 11 are only the four solid-state light sources 11a connected in series to each other as shown in FIG. 1, the current (the current flowing into the solid-state light source array 11) flowing through the solid-state light source array 11 and the current flowing through each of the solid-state light sources 11a are equal to each other. Therefore, the "current flowing through the solid-state light source array 11" is used hereinafter also as the meaning of the "current flowing through each of the solid-state light sources 11a."

The voltage detection resistors 4a, 4b are resistors used for detecting the forward voltage drop (Vf) of the solid-state light sources 11a connected in series to each other, and are connected in parallel to the solid-state light source array 11 while being connected in series to each other. The voltage detection resistors 4a, 4b are so-called voltage dividing resistors, and a voltage proportional to the forward voltage drop (Vf) as the detection object appears at the node therebetween. It should be noted that in the case in which the solid-state light sources 11a provided to the solid-state light source array 11 are only the four solid-state light sources 11a connected in series to each other as shown in FIG. 1, the forward voltage drop (Vf) of the solid-state light sources 11a connected in series to each other and the voltage of the solid-state light source array 11 are equal to each other. Therefore, the "voltage of the solid-state light source array 11" is used hereinafter also as the meaning of the "forward voltage drop (Vf) of the solid-state light sources 11a."

The operational amplifier 5 has the non-inverted input terminal connected between the drive circuit 2 and the current detection resistor 3 and the inverted input terminal connected between the current detection resistor and the solid-state light source array 11 to thereby amplify the voltage drop (the voltage drop corresponding to the current flowing through the solid-state light source array 11) appearing in the current detection resistor 3 at a predetermined gain. The signal output from the operational amplifier 5 is a signal representing the detection result of the current flowing through the solid-state light source array 11. The operational amplifier 6 has the non-inverted input terminal connected to the node between the voltage detection resistors 4a, 4b and the inverted input terminal grounded to thereby amplify the voltage (the voltage proportional to the voltage of the solid-state light source array 11 as the detection object) input to the non-inverted input terminal at a predetermined gain. The signal output from the operational amplifier 6 is a signal representing the detection result of the voltage of the solid-state light source array 11 having a series connection structure.

The control circuit 7 performs control of the drive circuit 2 using the signals output from the operational amplifiers 5, 6. Specifically, the control circuit 7 determines whether or not discontinuity of at least one of the voltage to be applied to the solid-state light source array 11 and the current to be supplied to the solid-state light source array 11 is present in accordance with the signals output from the operational amplifiers 5, 6. Then, if it is determined that the discontinuity is present, the control circuit 7 changes the control of the current or the voltage performed on the solid-state light source array 11. Although the details are described later, the reason for performing the change in the control is to prevent the excessive current to thereby extend the life span of the solid-state light source array 11 or to prevent the variation in the light intensity of the solid-state light source array 11.

As shown in FIG. 1, the control circuit 7 is provided with a memory 7a (a storage section) for storing the data obtained by performing digital conversion on the signals output from the operational amplifiers 5, 6, and compares the data obtained by performing the digital conversion on the signal obtained from at least one of the operational amplifiers 5, 6 with the data stored in the memory 7a to thereby determine whether or not the discontinuity described above is present. In other words, if the rate of change of the voltage or the current exceeds a specified value determined previously, it is determined that the discontinuity of the voltage or the current has occurred. It should be noted that although it is possible for the control circuit 7 to determine whether or not the discontinuity of the voltage of the solid-state light source array 11 and the current flowing through the solid-state light source array 11 using the signals output from the operational amplifiers 5, 6, the example of determining whether or not the discontinuity of the voltage of the solid-state light source array 11 using the signal output from the operational amplifier 6 will hereinafter be explained in order for simplifying the explanation.

The discontinuity of the voltage or the like described above is caused by the short circuit of some of the solid-state light sources 11a connected in series to each other provided to the solid-state light source array 11. Specifically, if each of the solid-state light sources 11a is normal, the voltage of the solid-state light source array 11 detected by the voltage detection resistors 4a, 4b is obtained as the sum of the forward voltage drops appearing in the respective solid-state light sources 11a. However, if some of the solid-state light sources 11a shorts, the voltage of the solid-state light source array 11 rapidly drops as much as the voltage corresponding to the forward voltage drop having appeared in the solid-state light source 11a shorting, and therefore, the discontinuity of the voltage or the like occurs.

Figure 3A:
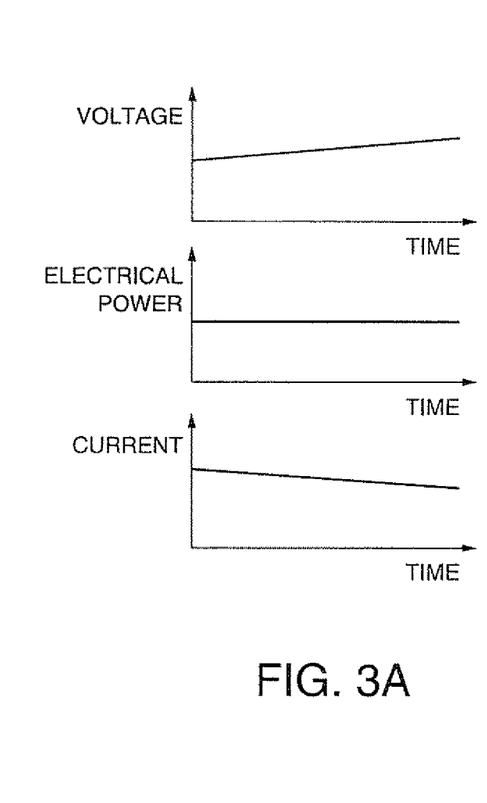
FIGS. 3A to 3C are diagrams for explaining a general outline of the control performed in the light source control device according to the embodiment of the invention.
Figure 3B:
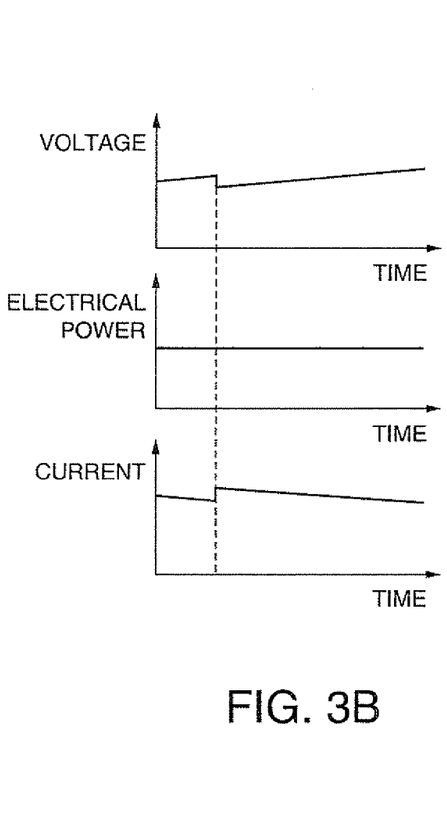
Figure 3C:
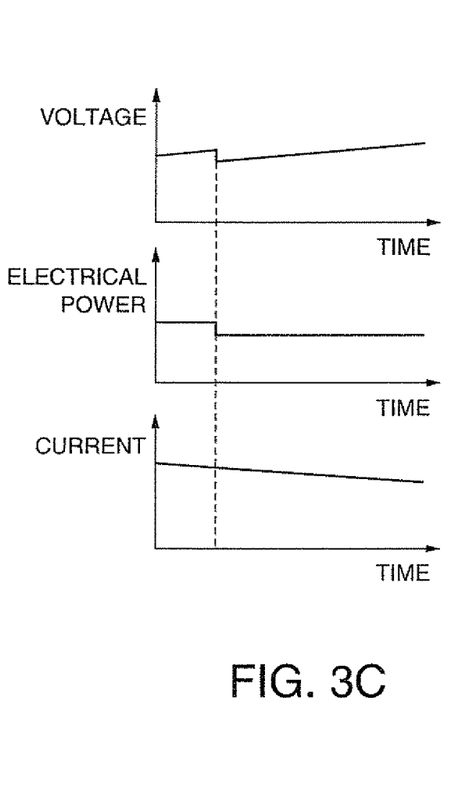

Then, a general outline of the control performed in the light source control device 1 under the initiative of the control circuit 7 will be explained. FIGS. 3A to 3C are diagrams for explaining the general outline of the control performed in the light source control device according to the embodiment of the invention. Firstly, since the light having the light intensity corresponding to the current supplied is emitted from each of the solid-state light sources 11a, the control circuit 7 basically performs the constant-current control (the control of supplying the solid-state light source array 11 with a constant current), with which the light intensity control is easily performed, on the solid-state light source array 11.

However, in the constant-current control, since the constant current is supplied to the solid-state light source array 11 even if the voltage of the solid-state light source array 11 is raised due to the temporal degradation or the like of the solid-state light sources 11a, the power consumption rises in accordance with the rise in the voltage of the solid-state light source array 11. Therefore, the control circuit 7 performs the constant-power control (the control of supplying the solid-state light source array with a constant electrical power) on the solid-state light source array 11 if it is required to reduce the power consumption in the case in which the voltage of the solid-state light source array 11 tends to rise. If the constant-power control is performed, since the current supplied to the solid-state light source array 11 is reduced in accordance with the rise in the voltage of the solid-state light source array 11, the power consumption becomes constant as shown in FIG. 3A.

If the rapid drop of the voltage due to the short circuit of the solid-state light sources 11a occurs during a period in which the control circuit 7 performs the constant-power control on the solid-state light source array 11, an excessive current is supplied so as to make the electrical power to be supplied to the solid-state light source array 11 constant as shown in FIG. 3B. If such an excessive current is supplied, there might be a possibility that the deterioration or the failure is caused in the normal solid-state light source 11a to thereby shorten the life of the solid-state light source array 11.

Therefore, in the present embodiment, if it is determined that the discontinuity of the voltage of the solid-state light source array 11 has occurred during the period in which the constant-power control is performed on the solid-state light source array 11, the control circuit 7 makes it a rule to change the control on the solid-state light source array 11 to the constant-current control as shown in FIG. 3C. Since such a change is performed, even in the case in which the rapid voltage drop due to the short circuit of some of the solid-state light sources 11a occurs, the excessive current can be prevented from being supplied to the other normal solid-state light sources 11a to thereby extend the life span of the solid-state light source array 11.

The control explained hereinabove with reference to FIGS. 3A to 3C is control giving priority to the power consumption and the life of the solid-state light source array 11. However, in some cases, the constant light intensity of the light from the solid-state light source array 11 takes priority over the power consumption and the life of the solid-state light source array 11. In such cases, it is desirable to arrange that the constant-power control is performed on the solid-state light source array to thereby make it possible to obtain the roughly constant light intensity from the solid-state light source array 11 when the discontinuity of the voltage occurs. It should be noted that whether the power consumption and the life of the solid-state light source array 11 takes priority or the light intensity of the solid-state light source array 11 takes priority can previously be set in the control circuit 7 in accordance with the intended purpose or the like, or can be made selectable by the user using a switch or the like.

Figure 4:
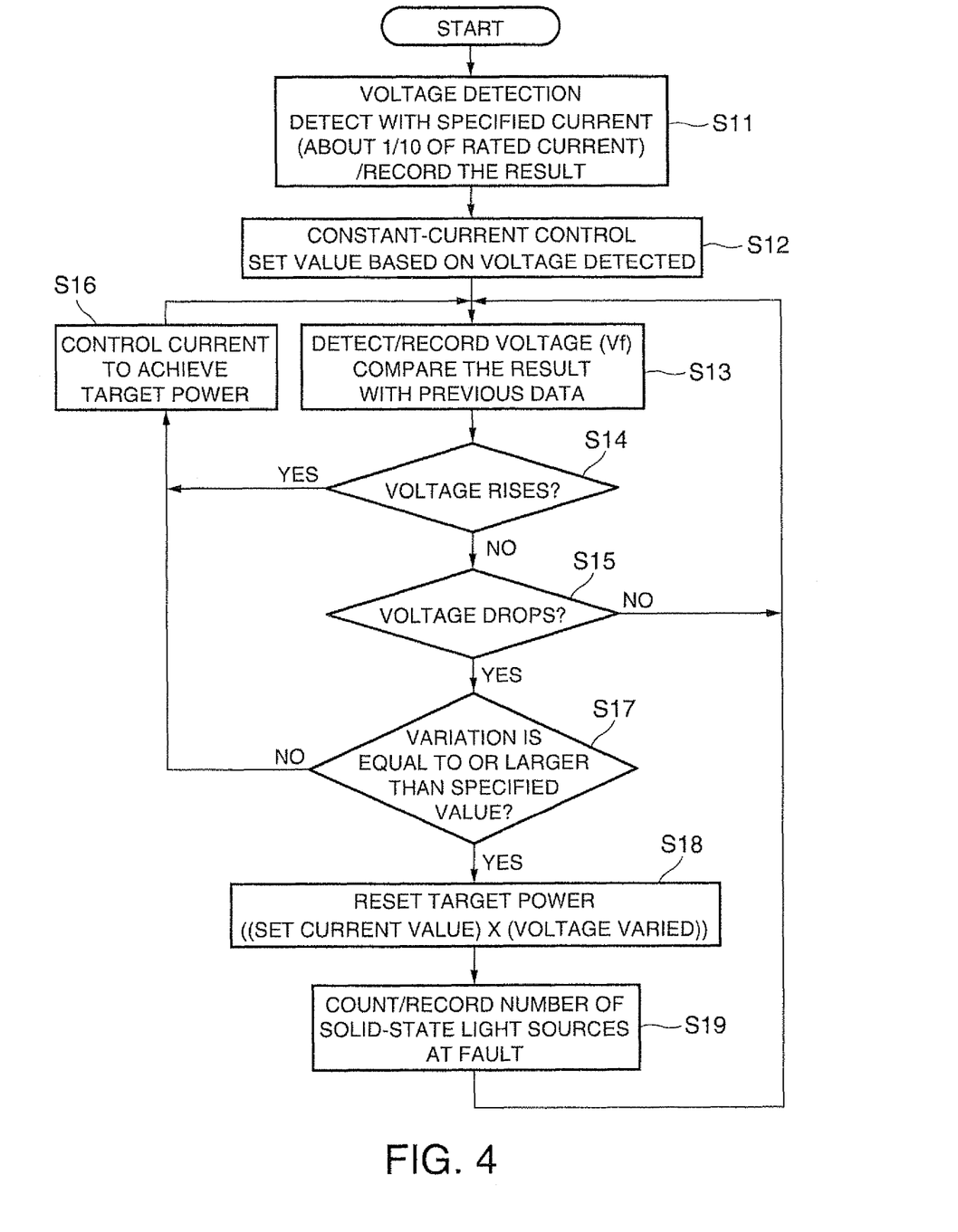
FIG. 4 is a flowchart showing an example of the control performed in the light source control device according to the embodiment of the invention.

Then, the details of the control performed in the light source control device 1 having the configuration described above will be explained. FIG. 4 is a flowchart showing an example of the control performed in the light source control device according to the embodiment of the invention. It should be noted that the flowchart shown in FIG. 4 is a flowchart showing the process of realizing the control explained with reference to FIGS. 3A to 3C. Further, the flowchart is started in response to power ON of the light source control device 1.

When the process is started, the control circuit 7 firstly monitors the output signals of the operational amplifiers 5, 6 while controlling the drive circuit 2 to gradually increase the amount of the current supplied to the solid-state light source array 11, and then detects the current-voltage characteristics of the solid-state light sources 11a provided to the solid-state light source array 11 to thereby figure out the deterioration state of the solid-state light sources 11a. Here, since the threshold current with which the laser oscillation is started tends to increase if deterioration occurs in the solid-state light source 11a as a semiconductor laser, the control circuit 7 figures out the deterioration state based on the threshold current.

When the emission of the blue light (the laser beam) from the solid-state light source array 11 is started, the control circuit 7 sets the current to be supplied to the solid-state light source array 11 to about a tenth of the rated current, detects the voltage of the solid-state light source array 11 based on the output signal of the operational amplifier 6, and then records the data showing the voltage thus detected on the memory 7a (step S11). The reason that the current to be supplied to the solid-state light source array 11 is set to about a tenth of the rated current when detecting the voltage of the solid-state light source array 11 is for eliminating the influence of the heat generated from the solid-state light sources 11a.

When the voltage detection described above is terminated, the control circuit 7 sets the amount of the current to be supplied to the solid-state light source array 11 based on the detection result in the step S11, and then starts the constant-current control on the solid-state light source array 11 (step S12). According to the control described above, the constant current is supplied to the solid-state light source array 11, and the light with the constant light intensity is emitted from each of the solid-state light sources 11*a*. It should be noted that the amount of the current to be supplied to the solid-state light source array 11 is set to the value obtained by dividing the target electrical power (the electrical power to be supplied to the solid-state light source array 11) set previously by the voltage value detected in the step S11, for example.

When a certain period of time elapses after the constant-current control has been started, the control circuit 7 detects the voltage of the solid-state light source array 11 based on the signal output from the operational amplifier 6, and then the data representing the voltage thus detected on the memory 7*a*. Then, the control circuit 7 compares the data newly detected and the data recorded on the memory 7*a* with each other (step S13). Subsequently, the control circuit 7 determines whether or not the rise in the voltage of the solid-state light source array 11 is present (step S14).

If it is determined in the step S14 that the rise in the voltage does not occur (in the case in which the determination result is "NO"), the control circuit 7 determines whether or not the drop in the voltage is present (step S15). If it is determined in the step S15 that the drop in the voltage does not occur (in the case in which the determination result is "NO"), the control circuit 7 performs (step S13) the detection of the voltage of the solid-state light source array 11, recording of the data representing the voltage thus detected, and the comparison between the new data and the data recorded on the memory 7*a* again after a certain period of time has elapsed. In other words, in the loop of the steps S13 through S15, since the voltage variation (the rise in the voltage) of the solid-state light source array 11 due to the temporal degradation and so on of the solid-state light sources 11*a* does not occur, the control circuit 7 continues the constant-current control on the solid-state light source array 11.

In contrast, if it is determined in the step S14 that the rise in the voltage has occurred (in the case in which the determination result is "YES"), the control circuit 7 switches the control on the solid-state light source array 11 to the constant-power control to thereby control the current value so that the electrical power supplied to the solid-state light source array 11 becomes equal to the target electrical power set previously (step S16). Thus, as is explained with reference to FIG. 3A, the control of reducing the current in accordance with the rise in the voltage of the solid-state light source array 11 to thereby make the electrical power supplied to the solid-state light source array 11 constant is performed. It should be noted that when the process of the step S16 is terminated, the process of the step S13 is performed.

In contrast, if it is determined in the step S15 that the voltage drop has occurred (in the case in which the determination result is "YES"), the control circuit 7 determines whether or not the voltage drop is a variation equal to or larger than the specified value set previously (step S17). If it is determined that the voltage drop is not the variation equal to or larger than the specified value (in the case in which the determination result is "NO"), the control circuit 7 continues the constant-power control to thereby control the current value so that the electrical power to be supplied to the solid-state light source array 11 becomes equal to the target electrical power set previously (step S16).

In contrast thereto, if it is determined in the step S17 that the voltage drop is the variation equal to or larger than the specified value (in the case in which the determination result is "YES"), the control circuit 7 changes the constant-power control presently performed on the solid-state light source array 11 to the constant-current control. Specifically, the control circuit 7 performs the control of resetting the target electrical power to the electrical power value obtained by multiplying the current value having been set immediately before the voltage drop equal to or larger than the specified value occurs by the voltage value detected immediately after the voltage drop equal to or larger than the specified value has occurred (step S18). Since such resetting is performed, the excessive current can be prevented from being supplied to the solid-state light source array 11, and thus, the life span of the solid-state light source array 11 can be extended.

After changing the control on the solid-state light source array 11 to the constant-current control, the control circuit 7 counts the number of the solid-state light sources 11*a* at fault in accordance with the level of the voltage drop, and then records the information representing the number of the solid-state light sources 11*a* at fault on the memory 7*a* (step S19). It should be noted that it is also possible to notify the user of the information representing the fact that the fault of the solid-state light sources 11*a* occurs or the information representing the number of the solid-state light sources 11*a* at fault when recording the information representing the number of the solid-state light sources 11*a* at fault.

As is explained hereinabove, the light source control device 1 according to the present embodiment detects the voltage of the solid-state light source array 11, then determines whether or not the discontinuity of the voltage is present using the detection result, and then changes the control of the current or the electrical power to be performed on the solid-state light source array 11 if it is determined that the discontinuity of the voltage is present. Therefore, it is possible to prevent the case, for example, in which the voltage of the solid-state light source array 11 drops rapidly during the constant-power control performed on the solid-state light source array 11 to thereby make the excessive current flow through the solid-state light source array 11, and thus shortening the life span of the solid-state light source array 11.

It should be noted that in the case of giving priority to the constant light intensity of the light from the solid-state light source array 11 over the power consumption and the life span of the solid-state light source array 11, the control circuit 7 performs the control of, for example, changing the constant-current control to the constant-power control. In other words, if the voltage of the solid-state light source array 11 drops rapidly during the period in which the constant-current control is in operation, the control of supplying the solid-state light source array 11 with the constant electrical power so as to make the light intensity of the light emitted from the solid-state light source array 11 constant is performed.

Figure 5:
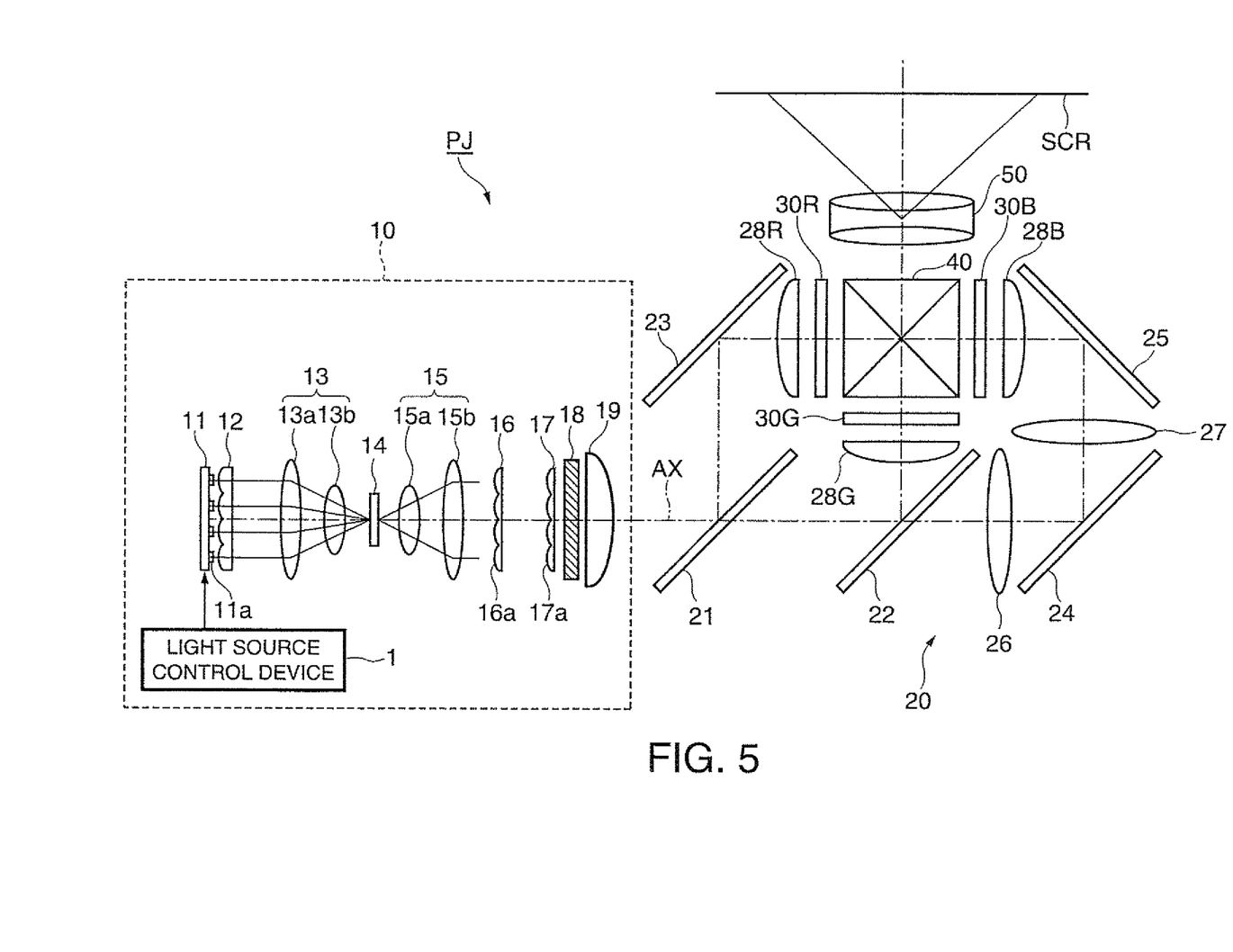
FIG. 5 is a diagram showing a configuration of a projector according to the embodiment of the invention.

Then, a projector according to the embodiment of the invention will be explained. FIG. 5 is a diagram showing a configuration of the projector according to the embodiment of the invention. As shown in FIG. 5, the projector PJ is provided with a illumination device 10, a color separation light guide optical system 20, liquid crystal light modulation devices 30R, 30G, and 30B (light modulation devices), a cross dichroic prism 40, and a projection optical system 50, and projects an image light corresponding to an image signal input from the outside to thereby display the image on a screen SCR.

The illumination device 10 is provided with the light source control device 1 and the solid-state light source array 11 described hereinabove, a collimator lens array 12, a light collection optical system 13, a fluorescence generation section 14, a collimator optical system 15, a first lens array 16, a second lens array 17, a polarization conversion element 18, and an overlapping lens 19, and emits white light including red light, green light, and blue light. The collimator lens array 12 is provided with a plurality of collimator lenses respectively corresponding to the plurality of solid-state light sources 11a provided to the solid-state light source array 11, and roughly collimates the blue light emitted from each of the solid-state light sources 11a.

Specifically, the collimator lens array 12 is composed of 16 collimator lenses each formed of a planoconvex lens arranged in a 4×4 matrix. The collimator lens array 12 is disposed in such a condition that the convex surfaces of the collimator lenses face the solid-state light source array 11, and the collimator lenses correspond respectively to the solid-state light sources 11a. The light collection optical system 13 is provided with a first lens 13a and a second lens 13b, and focuses the blue light roughly collimated by the collimator lens array 12 at a position adjacent to the fluorescence generation section 14.

The fluorescence generation section 14 is disposed in the vicinity of the focus position of the light collection optical system 13, and has a fluorescent layer (not shown) for generating a fluorescence including the red light and the green light from some of the blue light collected by the light collection optical system 13, and a transparent member (not shown) for supporting the fluorescent layer. Specifically, the fluorescence generation section 14 is disposed at a position where the blue light collected by the light collection optical system 13 enters the fluorescent layer in a defocused state. The fluorescence generation section 14 emits the light including the blue light, which is transmitted through the fluorescent layer without being involved in the generation of the fluorescence, together with the fluorescence, and appearing white light as a whole.

The fluorescent layer described above is formed of a layer including, for example, $(Y,Gd)_3(Al,Ga)_5O_{12}$:Ce as a YAG fluorescent material. The fluorescent layer converts some of the blue light collected by the light collection optical system 13 into the fluorescence including the red light (having the emission intensity peak at around 610 nm) and the green light (having the emission intensity peak at around 550 nm), and then emits the fluorescence. It should be noted that part of the blue light transmitted through the fluorescent layer without being involved in the generation of the fluorescence out of the blue light is emitted together with the fluorescence. The collimator optical system 15 is provided with a first lens 15a and a second lens 15b, and roughly collimates the light from the fluorescence generation section 14.

The first lens array 16 has a plurality of small lenses 16a, and divides the light from the solid-state light source array 11 into a plurality of partial light beams. Specifically, the plurality of small lenses 16a provided to the first lens array 16 is arranged in a matrix composed of a plurality of rows and a plurality of columns in a plane perpendicular to an illumination light axis AX. It should be noted that the outer shape of the plurality of small lenses 16a provided to the first lens array 16 is a roughly similar shape with respect to the outer shape of the image forming area of each of the liquid crystal light modulation devices 30R, 30G, and 30B.

The second lens array 17 has a plurality of small lenses 17a corresponding to the small lenses 16a provided to the first lens array 16. Specifically, the plurality of small lenses 17a provided to the second lens array 17 is arranged in a matrix composed of a plurality of rows and a plurality of columns in a plane perpendicular to the illumination light axis AX similarly to the plurality of small lenses 16a provided to the first lens array 16. The second lens array 17 images the image of each of the small lenses 16a of the first lens array 16 in the vicinity of the image forming area of each of the liquid crystal light modulation devices 30R, 30G, and 30B in cooperation with the overlapping lens 19.

The polarization conversion element 18 has a polarization separation layer, a reflecting layer, and a retardation plate (any not shown), and converts each of the partial beams split into by the first lens array 16 into a substantially unique linearly polarized light beam having a uniform polarization direction, and emits the resulted partial light beams. Here, the polarization separation layer transmits one of the linearly polarized components out of the polarized components included in the light from the solid-state light source array 11 without modification, and reflects the other of the linearly polarized components in a direction perpendicular to the illumination light axis AX. Further, the reflecting layer reflects the other of the linearly polarized components reflected by the polarization separation layer in a direction parallel to the illumination light axis AX. Further, the retardation plate converts the other of the linearly polarized components reflected by the reflecting layer into the one of the linearly polarized components.

The overlapping lens 19 is disposed so that the optical axis thereof coincides with the optical axis of the illumination device 10, and collects the partial light beams from the polarization conversion element 18 to make the partial light beams overlap each other in the vicinity of the image forming area of each of the liquid crystal light modulation devices 30R, 30G, and 30B. The first lens array 16, the second lens array 17, and the overlapping lens 19 described above constitute a lens integrator optical system for homogenizing the light from the solid-state light source array 11.

The color separation light guide optical system is provided with dichroic mirrors 21, 22, reflecting mirrors 23 through 25, relay lenses 26, 27, and collecting lenses 28R, 28G, and 28B, and separates the light from the illumination device 10 into the red light, the green light, and the blue light, and then guides them to the liquid crystal light modulation devices 30R, 30G, and 30B, respectively. The dichroic mirrors 21, 22 are mirrors each having a wavelength selecting transmissive film, which reflects the light in a predetermined wavelength band and transmits the light in another wavelength band, formed on a transparent substrate. Specifically, the dichroic mirror 21 reflects the red light component and transmits the green light component and the blue light component, and the dichroic mirror 22 reflects the green light component and transmits the blue light component.

The reflecting mirror 23 is a mirror for reflecting the red light component, while the reflecting mirrors 24, 25 are mirrors for reflecting the blue light component. The relay lens 26 is disposed between the dichroic mirror 22 and the reflecting mirror 24, and the relay lens 27 is disposed between the reflecting mirror 24 and the reflecting mirror 25. It should be noted that since the length of the light path of the blue light is larger than the length of the light paths of other colored lights, the relay lenses 26, 27 are provided in order for preventing the degradation of the light efficiency due to the diffusion of the light. The collecting lenses 28R, 28G, and 28B collect the red light component reflected by the reflecting mirror 23, the green light component reflected by the dichroic mirror 22, and the blue light component reflected by the reflecting mirror 25 in the image forming areas of the liquid crystal light modulation devices 30R, 30G, and 30B, respectively.

The red light reflected by the dichroic mirror 21 is reflected by the reflecting mirror 23, and enters the image forming area of the liquid crystal light modulation device 30R for the red light via the collecting lens 28R. The green light having passed through the dichroic mirror 21 is reflected by the dichroic mirror 22, and then enters the image forming area of the liquid crystal light modulation device 30G for the green light via the collecting lens 28G. The blue light having passed through the dichroic mirrors 21, 22 enters the image forming area of the liquid crystal light modulation device 30B for the blue light after sequentially passing through the relay lens 26, the reflecting mirror 24, the relay lens 27, the reflecting mirror 25, and the collecting lens 28B.

The liquid crystal light modulation devices 30R, 30G, and 30B modulate the colored lights input therein in accordance with the image signal input from the outside, and generate the red image light, the green image light, and the blue image light, respectively. It should be noted that, although omitted from FIG. 5, the entrance side polarization plates are disposed between the collecting lenses 28R, 28G, and 28B and the liquid crystal light modulation devices 30R, 30G, and 30B, respectively, so as to intervene therebetween, and the exit side polarization plates are disposed between the liquid crystal light modulation devices 30R, 30G, and 30B, and the cross dichroic prism 40, respectively, so as to intervene therebetween.

The liquid crystal light modulation devices 30R, 30G, and 30B are each a transmissive liquid crystal light modulation device having the liquid crystal as an electro-optic material airtightly encapsulated between a pair of transparent glass substrates, and are each provided with, for example, polysilicon thin film transistors (TFT) as the switching elements. The polarization directions of the colored lights (the linearly polarized lights) via the entrance side polarization plates not shown described above are modulated by the switching operations of the switching elements provided to the liquid crystal light modulation devices 30R, 30G, and 30B, thereby generating the red image light, the green image light, and the blue image light corresponding to the image signal, respectively.

The cross dichroic prism 40 combines the image lights emitted from the respective exit side polarization plates not shown described above to thereby form the color image. Specifically, the cross dichroic prism 40 is an optical member having a substantially cubic shape composed of four rectangular prisms bonded to each other, and on the substantially X-shaped interfaces on which the rectangular prisms are bonded to each other, there are formed dielectric multilayer films. The dielectric multilayer film formed on one of the substantially X-shaped interfaces is for reflecting the red light, and the dielectric multilayer film formed on the other of the interfaces is for reflecting the blue light. The red light and the blue light are deflected by these dielectric multilayer films to have the proceeding direction aligned with the proceeding direction of the green light, thus the three colored lights are combined to each other. The projection optical system 50 projects the color image combined by the cross dichroic prism 40 toward the screen SCR in an enlarged manner.

The projector PJ described hereinabove is provided with the light source control device 1 for changing the control of the current or the electrical power to be performed on the solid-state light source array 11 in accordance with the rapid variation in the voltage of the solid-state light source array 11. Therefore, the projector PJ according to the present embodiment is capable of performing the control of giving priority to the power consumption and the product life span or the control of giving priority to the light intensity over the product life span and the like in accordance with the intended purpose.

Although the light source control device and the projector according to the embodiment of the invention are hereinabove explained, the invention is not limited to the embodiment described above, but can freely be modified within the scope or the sprit of the invention. The modified examples described hereinafter, for example, are possible.

1. Although in the embodiment described above, the case in which the solid-state light sources 11a formed to have an arrangement of the solid-state light source array 11 are the semiconductor lasers is explained as an example, the invention is not limited thereto. The invention can also be applied to the solid-state light source array having the solid-state light sources formed of light emitting diodes.

2. Although in the embodiment described above the example having a plurality of solid-state light sources 11a connected in series and in parallel to each other, and controlling the solid-state light sources 11a by the light source control device 1 is explained, the invention is not limited thereto. It is also possible, for example, to provide the light source control device for each of the columns C1 through. C4 shown in FIG. 2, and to control the solid-state light sources 11a connected in series in each of the columns with a plurality of light source control devices.

3. Although in the embodiment described above the example of arranging the solid-state light sources in a sheet is explained, the invention is not limited thereto. The invention can also be applied to the case, for example, in which the solid-state light sources are arranged linearly. In addition, although in the embodiment described above the example of arranging the solid-state light sources in the vertical direction and the lateral direction of the substrate SB at regular intervals is explained, the solid-state light sources can also be arranged in a honeycomb pattern. Here, the honeycomb pattern denotes the arrangement in which the solid-state light source is located at each of the intersections of the regular hexagons arranged tightly.

4. Although in the embodiment described above, the transmissive projector is explained as an example of the projector, the invention is not limited thereto. The invention can also be applied to, for example, a reflective projector. It should be noted here that "transmissive" denotes that the light modulation device is a type of transmitting the light such as a transmissive liquid crystal display device, and "reflective" denotes that the light modulation device is a type of reflecting the light such as a reflective liquid crystal display device. Also in the case in which the invention is applied to the reflective projector, the same advantages as in the case with the transmissive projector can be obtained.

5. Although in the embodiment described above the example of using the liquid crystal light modulation devices as the light modulation devices is explained, the invention is not limited thereto. Any devices for modulating the incident light in accordance with the image signal, in general, can be adopted as the light modulation devices, and the light valves, the micromirror light modulation devices, and so on can also be adopted. As the micromirror light modulation device, for example, a digital micromirror device (DMD, a trademark of Texas Instruments) can be used.

6. The invention can be applied to a front projection projector for performing projection from the side of observing the projection image, and also to a rear projection projector for performing projection from the side opposite to the side of observing the projection image.

The entire disclosure of Japanese Patent Application No. 2010-189682, filed Aug. 26, 2010 is expressly incorporated by reference herein.

What is claimed is:

1. A light source control device adapted to control a light source device having a plurality of solid-state light sources connected in series to each other, the light source control device comprising:
   a detector adapted to detect at least one of a voltage applied to the solid-state light sources and a current supplied to the solid-state light sources; and
   a control section adapted to determine whether or not discontinuity of at least one of the voltage and the current is present using a detection result of the detector, and change control of one of the current and electrical power performed on the light source device if it is determined that the discontinuity is present, wherein
   the control section includes a storage section adapted to store the detection result of the detector, and compares the detection result of the detector and the detection result stored in the storage section with each other to thereby determine whether or not the discontinuity is present.

2. The light source control device according to claim 1, wherein
   the control section performs constant-power control corresponding to the detection result of the detector on the light source device if it is determined that the discontinuity is absent.

3. The light source control device according to claim 2, wherein
   the control section changes the constant-power control presently performed on the light source device to constant-current control if it is determined that the discontinuity is present.

4. A projector comprising:
   a light source device including a plurality of solid-state light sources connected in series to each other;
   a light modulation device adapted to modulate a light from the light source device;
   a projection optical system adapted to project the light modulated by the light modulation device on a screen; and
   the light source control device according to claim 1 adapted to control the light source device.

5. The projector according to claim 4, wherein
   the plurality of solid-state light sources provided to the light source device is arranged in one of a line and a sheet.

6. A projector comprising:
   a light source device including a plurality of solid-state light sources connected in series to each other;
   a light modulation device adapted to modulate a light from the light source device;
   a projection optical system adapted to project the light modulated by the light modulation device on a screen; and
   the light source control device according to claim 2 adapted to control the light source device.

7. The projector according to claim 6, wherein
   the plurality of solid-state light sources provided to the light source device is arranged in one of a line and a sheet.

8. A projector comprising:
   a light source device including a plurality of solid-state light sources connected in series to each other;
   a light modulation device adapted to modulate a light from the light source device;
   a projection optical system adapted to project the light modulated by the light modulation device on a screen; and
   the light source control device according to claim 3 adapted to control the light source device.

9. The projector according to claim 8, wherein
   the plurality of solid-state light sources provided to the light source device is arranged in one of a line and a sheet.

10. A light source control device adapted to control a light source device having a plurality of solid-state light sources connected in series to each other, the light source control device comprising:
    a detector adapted to detect at least one of a voltage applied to the solid-state light sources and a current supplied to the solid-state light sources; and
    a control section adapted to determine whether or not discontinuity of at least one of the voltage and the current is present using a detection result of the detector, and change control of one of the current and electrical power performed on the light source device if it is determined that the discontinuity is present, wherein
    the control section performs constant-power control so that the light source device is supplied with constant power if it is determined that the discontinuity is present.

11. A projector comprising:
    a light source device including a plurality of solid-state light sources connected in series to each other;
    a light modulation device adapted to modulate a light from the light source device;
    a projection optical system adapted to project the light modulated by the light modulation device on a screen; and
    the light source control device according to claim 10 adapted to control the light source device.

12. The projector according to claim 11, wherein
    the plurality of solid-state light sources provided to the light source device is arranged in one of a line and a sheet.

13. A light source control device adapted to control a light source device having a plurality of solid-state light sources connected in series to each other, the light source control device comprising:
    a detector adapted to detect at least one of a voltage applied to the solid-state light sources and a current supplied to the solid-state light sources; and
    a control section adapted to determine whether or not discontinuity of at least one of the voltage and the current is present using a detection result of the detector, and change control of one of the current and electrical power performed on the light source device if it is determined that the discontinuity is present, wherein
    the control section figures out a deterioration state of the solid-state light sources based on the voltage and the current detected by the detector while gradually increasing an amount of current supplied to the solid-state light sources.

14. A projector comprising:
    a light source device including a plurality of solid-state light sources connected in series to each other;
    a light modulation device adapted to modulate a light from the light source device;
    a projection optical system adapted to project the light modulated by the light modulation device on a screen; and
    a light source control device according to claim 13 adapted to control the light source device.

15. The projector according to claim 14, wherein the plurality of solid-state light sources provided to the light source device is arranged in one of a line and a sheet.

* * * * *